May 1, 1928. 1,668,205

W. J. HUGHES

STRAINER HEAD FOR FILTERING PURPOSES

Filed April 4, 1924

INVENTOR.
Walter J. Hughes.
BY Walter A. Knight
ATTORNEY

Patented May 1, 1928.

1,668,205

UNITED STATES PATENT OFFICE.

WALTER J. HUGHES, OF FORT WAYNE, INDIANA, ASSIGNOR, BY MESNE ASSIGNMENTS, TO THE PERMUTIT COMPANY, OF NEW YORK, N. Y., A CORPORATION OF DELAWARE.

STRAINER HEAD FOR FILTERING PURPOSES.

Application filed April 4, 1924. Serial No. 704,106.

My invention relates to strainer heads for filtering apparatus in which is placed a bed of comminuted filtering material. This filter bed generally rests on gravel and it is usually desired that the gravel be fine instead of coarse.

The purpose of these strainer heads is to permit the free passage of the liquid treated into or out of a filter chamber while preventing the supporting filtering material contiguous to the short tubes from passing out and being wasted, or from clogging the short tubes.

Where plain openings are used the supporting material, usually gravel, has had to be used coarser than was desired to keep it from stopping up the openings.

With my improved strainer head fine gravel may be used. The liquid forces in from below, as in back-washing a downward or gravity filter, or in supplying raw water to an upward flow filter, is spread out by the strainer heads at the bottom of the supporting gravel and insures an even flow through the filter.

When liquid is draining from such a filter these devices act as collectors and keep the gravel from clogging up the short tubes or passing out therethru. As the devices are located substantially at the lowest point of the filter chamber the liquid collected there flows freely under the shield of the device and through the tubular portion constituting proportioning exits to the discharge member.

My invention is illustrated in the accompanying drawing, in which:—

Figure 1:
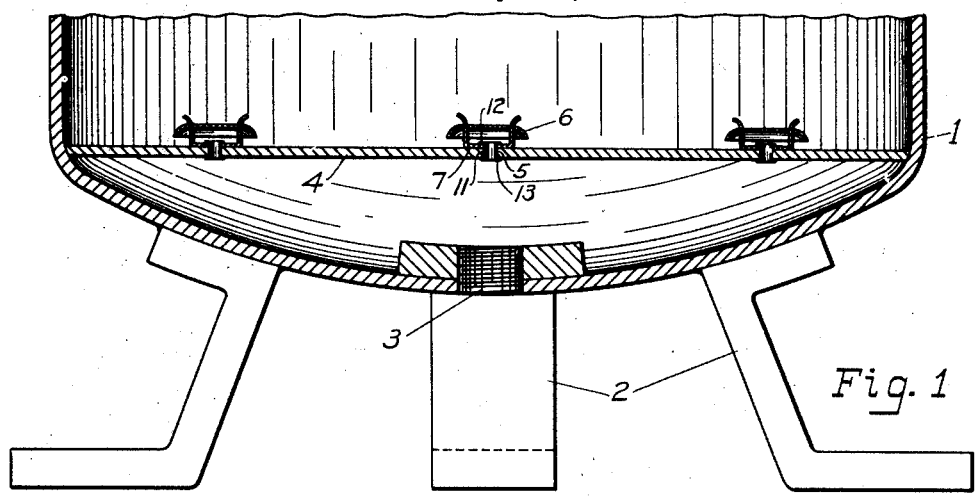
Figure 5:
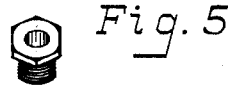
Figure 2:
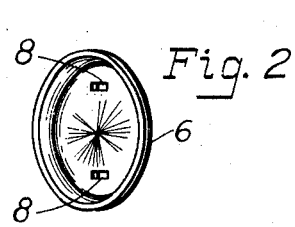
Figure 3:
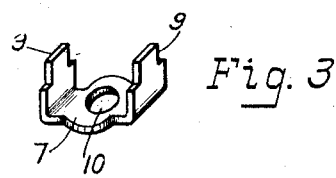
Figure 4:
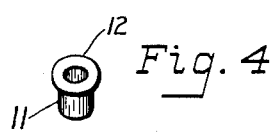

Figure 1 is the lower portion of a zeolite water softener of the filter type in vertical axial section with a horizontal supporting plate fitted with a plurality of these strainer head devices, three of them being shown in vertical axial section;

Fig. 2, a detail, is a perspective from the under side of a shallow cup-shaped shield;

Fig. 3, a detail, is a perspective of the yoke to the top of which the shield is secured and which is itself secured by the tubular portion to the horizontal supporting plate;

Fig. 4, a detail, is the short tube portion forming a hollow rivet by which the yoke is secured to the plate; and Fig. 5, a detail, is an alternative threaded form of the short tube portion particularly adapted for use in devices where, instead of a plate, the strainer heads are attached to horizontal pipes.

Referring now to the drawings, 1 is the casing of a zeolite water softener of the filter type supported by legs 2, with drain outlet 3, and horizontal plate 4 adapted to support the superimposed filter bed (not shown). There are holes 5 through the plate 4.

The strainer head, which is the subject of this invention, consists of three pieces, a shallow cup-shaped shield 6, a yoke 7, and a short tube element 11. Through perforations 8, 8, in the shield 6 pass the ends 9, 9, of the yoke 7. Through a hole 10 in the yoke 7 and one of the holes 5 in the plate 4 passes the tubular rivet 11 and rests upon its head 12. The lower end of tubular rivet 11 is then beaded over to form a flange 13, holding the yoke 7 securely to the plate 4. The shield is then placed in position and the ends 9, 9, of the yoke 7 are then bent as shown in Fig. 1 to hold the shield securely in position.

The tubular portion of the rivet 11 and the holes 5 may be threaded, the top flange being then formed for wrench contact as shown in Fig. 5. This form will be particularly useful where the strainer heads are fixed to pipes instead of plates. In plates such as 4 of Fig. 1 the beaded tubular rivet is desirable as the plate may weave about under changes and direction of pressure, whereas the threaded tubular rivets when screwed into a lateral pipe are not subjected to this condition.

Obviously many changes may be made in these strainer head devices without departing from the spirit of my invention.

I claim as my invention and desire to secure by Letters Patent of the United States:—

1. A strainer head for filtering apparatus, having in combination, a U-shaped member, a hole through the base of said member, a tubular element in said hole to secure said member in operating position, a shield, openings in said shield to receive the upper ends of upright portions of said U-shaped member, and means for securing said shield to said upright portions.

2. A strainer head for filtering apparatus, having in combination, a U-shaped member, a hole through the base of said member, a tubular element in said hole to secure said member in operating position, the top portion of each upright portion of said U-shaped member notched to form a holding lug, a shield, openings in said shield to receive said lugs and means for securing said shield securely in position on said lugs.

3. A strainer head for filtering apparatus, having in combination, a U-shaped member, a hole through the base of said member, a tubular element in said hole to secure said member in operating position, the top portion of each upright portion of said U-shaped member notched to form a holding lug, a shield in the form of an inverted cup, openings in said shield to receive said lugs, said lugs long enough to protrude beyond the convex surface of said shield and be bent to hold the shield in position on said upright portions.

In testimony whereof I have hereunto set my hand.

WALTER J. HUGHES.